United States Patent Office 3,008,948
Patented Nov. 14, 1961

3,008,948
CATALYST OF ORTHO VANADIUM ESTER AND ORGANO-ALUMINUM COMPOUND AND ETHYLENE POLYMERIZATION THEREBY
Guido B. Stampa, Montclair, and Alford G. Farnham, Mendham, N.J., assignors to Union Carbide Corporation, a corporation of New York
No Drawing. Filed June 26, 1957, Ser. No. 668,030
14 Claims. (Cl. 260—94.9)

This invention relates to a novel catalyst composition and its use for polymerization of ethylene to normally solid polymers free from corrosive catalyst residues.

Polymerization of ethylene to normally solid polymers by subjecting ethylene to extremely high pressures moderate temperatures of the order of 150° C. to about 300° C. and preferably in the presence of minute amounts of oxygen or derivatives thereof such as the alkyl peroxides is known to yield polymer having no apparent corrosive properties. Thus in heat-forming such polyethylene as by extrusion or injection molding, the metal surfaces of such forming equipment have never been known to be corroded by the action of the polymer per se.

More recently, other catalytic procedures for polymerizing ethylene have been disclosed and these are effective in polymerizing olefins such as ethylene and propylene, even at atmospheric pressures and temperatures as low as room temperature. These procedures generally use a catalyst composition comprising an aluminum alkyl such as aluminum triethyl or an aluminum dialkyl halide such as diethylchloroaluminum as one component and as the other component a halide of a transition metal for example titanium, vanadium, or zirconium. The catalyst composition is generally dispersed in an inert hydrocarbon diluent such as purified kerosine, heptane, and the like. The resultant polymers are generally characterized by a higher density and melting point than the polyethylene prepared by the older high pressure, oxygen catalyzed procedures.

Unfortunately, although various strenuous purification procedures have been proposed to remove the alkyl aluminum and transition metal halide residues from the polymer such as washing with alcohol, filtration, and the like, sufficient of the residues remain in the polymer to be detected by a measurable ash content, as well as by the corrosive behavior of the polymer on metal surface. It is believed that a major cause of the observed corrosion effects is due to organo halide compounds formed by reaction of the catalyst component with ethylene monomer and/or ethylene polymer. At least some of said organo halide compounds or their decomposition products are volatile enough at molding temperatures to be released from the polymer, the volatilized compound then condensing on cooler metal surfaces such as the injection mold cavity surface and cause mold staining and pitting, being more severe in the instance of plain carbon steel surfaces and to a lesser but still objectionable extent with chromium plated surfaces.

Although obviously it would appear that elimination of halogen in any form in the catalyst composition would theoretically remove the possibility of mold corrosion, the catalyst systems thus far proposed comprising an organo compound of aluminum and a transition metal compound free from halogen have not been found effective in polymerizing olefins and particularly ethylene to a high molecular weight normally solid polymer. Instead, such systems have yielded from ethylene monomer, dimers such as butylene, viscous oils, and in some instances a negligible amount of solid polymer as a side reaction product. At best, acetyl-acetonates of trivalent titanium or of vanadium or of chromium in admixture with an aluminum alkyl effect a very slow, commercially unattractive polymerization of ethylene at atmospheric pressure to a solid polymer, and such slow reaction rate does not change appreciably with an increase in temperature and/or pressure. Also of interest is that mixtures of a titanium alkoxide and an aluminum alkyl cause rapid dimerization of ethylene to butene, only a minute quantity of solid polymer being formed by side reactions.

It has now been found that ethylene is readily polymerized to normally solid polymers free from corrosive halogen residues by bringing ethylene in contact with a catalyst composition dispersed in an inert hydrocarbon diluent comprising a halogen-free organo aluminum compound and a vanadic ester.

The preferred vanadic esters are the ortho esters and particularly partially hydrolyzed ortho esters. The ortho esters have the general formula $R_3VO_4$ wherein each R is an alkyl group, the number of carbon atoms in the alkyl group not being a determinative factor as regards operability.

The ortho esters of vanadium have been known for some time (cf. W. Prandtl and L. Hess, Z. anorg. Chem., 1913, vol. 82, page 103); are conventionally prepared by reacting together vanadium pentoxide with a large excess of the particular saturated, aliphatic monohydric alcohol at reflux temperature.

It has been further found that higher polymerization rates are obtained with the partially hydrolyzed ortho vanadium esters than with the unhydrolyzed esters. Although complete hydrolysis of the ortho esters $R_3VO_4$ results in the formation of pentoxide $V_2O_5$ which is not catalytically effective in admixture with organo aluminum compound to polymerize ethylene to a solid polymer, the employment of smaller quantities of water than that required for complete hydrolysis yields various solid polyvanadic esters including the metavanadic esters $R_3V_3O_9$ and the pentavanadic esters $R_3V_5O_{14}$. This stepwise hydrolysis is analogous to the stepwise condensation with acid of inorganic vanadates to polyvanadates and finally to the pentoxide.

Partial hydrolysis of the ortho vanadium esters is readily obtained by adding a calculated quantity of water to a dilute solution of the ortho ester in a solvent which can be the alcohol (or alcohols) from which the ortho ester was derived, but which is, however, preferably a solvent having no chemical activity in the hydrolysis reaction, such inert solvent being exemplified by dioxane, hydrocarbons such as benezene, toluene, and heptane, and ethers such as diethyl ether. The calculated amount of water lies in a range between 1 and 1.5 moles per mole of ortho ester. Amounts of water more than 1.5 moles give the catalytically inactive vanadium pentoxide and, on the other hand, less than 1 mole of water tends to yield products soluble in the reaction medium having substantially the same catalytic activity as the unhydrolyzed ortho esters.

The polymerization of ethylene in the presence of the catalyst composition consisting of organo aluminum compound and ortho vanadium ester or partial hydrolysis product thereof is more effectively carried out by dispersing the catalyst composition in an inert hydrocarbon liquid. By inert is meant that the hydrocarbon liquid is free from reactive groups such as hydroxyl, halogen, amino, and nitro, as well as free from olefinic or acetylenic unsaturation and also free from impurities such as oxygen and water. Hydrocarbon liquids suitable as inert diluent and dispersant for the catalyst composition include purified kerosine, heptane, octane, benzene, and toluene. Such hydrocarbons must be moisture free, since water inactivates the catalyst composition.

Preferably the catalyst composition contains at least one gram mole of organo aluminum compound per gram atom of vanadium as vanadic ester. However, a considerable molar excess of organo aluminum compound, e.g. upwards to about 10:1 and this is often desirable for scavenging the reaction system of impurities such as moisture and oxygen.

The concentration of catalyst composition dispersed in the inert hydrocarbon diluent per liter thereof which produces optimum yields of solid polymer is from 1 to 10 milliequivalents of vanadic ester and the same or excess molar amounts of organo aluminum compound.

While the catalyst composition is effective in obtaining appreciable yields of polymer when ethylene is contacted therewith at room temperature and atmospheric pressure the polymer yield is greatly benefited by conducting the polymerization at above atmospheric pressures and at temperatures of from about 25° to 140° C. and higher if desired.

The resultant polymer can be conveniently isolated from the catalyst composition by quenching the reaction mixture with an alcohol such as ethanol, isopropanol, and the like, and then filtering off the polymer. The catalyst can also be removed by washing the reaction mixture with an aqueous alkaline or acidic solution as for example an aqueous solution of sodium hydroxide or of hydrochloric acid.

The invention is further illustrated in the following examples which are to be construed as exemplifications to those skilled in the art and as not restrictive to the invention except as defined in the appended claims.

EXAMPLE 1

A catalyst composition was prepared in a 3 necked 2 liter size Pyrex glass flask by dispersing 2.1 grams of distilled tri-n-butyl vanadate $(C_4H_9)_3VO_4$ and 4.6 grams of triisobutyl aluminum in 1000 ml. benzene. Ethylene gas of 99.5 percent purity was bubbled through the benzene-catalyst dispersion at a rate of 100 cc. per minute for four hours, the temperature of the reaction systems being 35°±1° C. At the end of the four hour reaction period 3 grams of halogen-free solid polyethylene polymer having a melt index (ASTM D1238–52T) of 0.0 was recovered by adding and stirring in the reaction mixture 200 cc. of ethyl alcohol and separating the polymer particles from the alcohol and hydrocarbon by filtration.

EXAMPLE 2

A catalyst composition was prepared by dispersing 2.3 grams of triethyl vanadate $(C_2H_5)_3VO_4$ and 4.6 grams triisobutyl aluminum in 1000 ml. benzene. The catalyst benzene dispersion was introduced into a Parr hydrogenation apparatus (2 liter size steel vessel). Ethylene was introduced in the apparatus to a gauge pressure of 200 p.s.i. The reaction mixture gradually increased in temperature from 20° C. to 45° C. during a total reaction period of 5½ hours. During this reaction period, two additions of ethylene were made to maintain the pressure of the system between 100 and 200 p.s.i. The reaction system was then quenched by the addition of 200 cc. ethyl alcohol; further washed with 200 cc. ethyl alcohol, the solid polymer was then recovered by filtration for a yield of 24 grams. The solid polymer had a density of 0.9578 at 25° C. and melt index of 0.0.

EXAMPLE 3

A partially hydrolyzed vanadic ester was prepared by rapidly adding 0.268 gram of water in 50 ml. dioxane to a solution of 2.318 grams of triethyl vanadate in 50 ml. of anhydrous dioxane (corresponding to a ratio of 1.3 moles $H_2O$ per mole vanadic ester). The light yellow vanadic ester solution initially turns a dark orange color and within a few seconds an orange colored solid precipitate is formed. After standing for 12 hours at room temperature the color has changed to green. The mixture is centrifuged to remove the dioxane and the solids washed thoroughly with dry benzene by reslurrying and centrifuging. Based on the amount of water used, the average composition of the product was calculated as having the formula $(C_2H_5)_4V_{10}O_{27}$.

EXAMPLE 4

A catalyst composition was prepared by dispersing in 1000 ml. of dry benzene 1.2 grams of the partially hydrolyzed vanadic ester $(C_2H_5)_4V_{10}O_{27}$ and 3.29 grams of aluminum triisobutyl. The catalyst composition was charged into a Parr low pressure hydrogenation apparatus. Ethylene gas was fed into the apparatus to a gauge pressure of 40 p.s.i. No further addition of ethylene was made while the reaction system was held for 90 minutes at an average reaction temperature of 30° C. At the end of this period, the pressure had dropped to 23 p.s.i. Solid ethylene polymer was obtained in a yield of 7.5 grams, the polymer having a melt index of 0.0.

Under the same reaction conditions and using an equivalent amount of the unhydrolyzed ortho ester (triethyl vanadate), only trace amounts of solid polyethylene was obtained.

Substituting an equivalent amount of a hydrolysis product of one mol water and one mol triethyl vanadate, calculated as $(C_2H_5)_4V_4O_{12}$ for the partially hydrolyzed vanadium ester used in Example 4 and under the same reaction conditions yielded 6.5 grams of solid ethylene polymer.

A vanadium ester of a still higher degree of hydrolysis obtained as a hydrolysis product of 1.4 mols water and 1 mol triethyl vanadate and calculated as $(C_2H_5)_2V_{10}O_{26}$ used in an equivalent quantity and under the same reaction conditions as in Example 4 yielded a somewhat smaller quantity of solid polyethylene, namely 5.5 grams.

The use of higher pressures with the partially hydrolyzed ortho vanadium esters greatly increases the yield of solid polymer. This is demonstrated by the data in the subsequent example.

EXAMPLE 5

A catalyst composition was prepared by dispersing in 1000 ml. of benzene 1.2 grams of the partially hydrolyzed vanadic ester used in Example 4, $(C_2H_5)_4V_{10}O_{27}$ and 4.6 grams of aluminum triisobutyl. Ethylene was introduced into the benzene-catalyst dispersion at room temperature and at initial reaction pressures, as indicated in subsequent Table I. The data in the table shows how the yield of solid ethylene polymer increases rapidly with increasing reaction pressure.

*Table I*

| Reaction Initial Pressure (gage) | Reaction Time, hrs. | Temperature at end of Reaction Time, ° C. | Yield of Solid Polymer, g. | Melt Index | Density of Sample Compression Molded at 160° C. |
|---|---|---|---|---|---|
| 800 p.s.i. | 3.5 | 140 | 206 | 0.0 | 0.946 @ 25° C. |
| 200 p.s.i. | 5.5 | 65 | 63 | 0.0 | 0.958 @ 25° C. |

The increase of reaction temperature at the conclusion of each run was due to the heat of reaction.

It will be observed that the above examples have illustrated the utility of certain vanadium ortho esters and their partially hydrolyzed derivatives. Comparable catalytic effectiveness can be had from other ortho vanadium esters, their isomers and their partially hydrolyzed derivatives and mixtures thereof in place of a single vanadic ester, including but not limited to the following examples:

Trimethyl vanadate
Tri-n-propyl vanadate
Triisoamyl vanadate
Triisooctyl vanadate
Tri-n-decyl vanadate
Tri-2-undecyl vanadate
Tri-n-dodecyl vanadate
Tri-n-octadecyl vanadate In place of the alkyl aluminum compound employed in the previous examples as one of the catalyst components, other organo aluminum compounds free from halogen compounds and having the formula AlR$_3$ or AlR$_2$H wherein R is a monovalent hydrocarbon radical can be substituted in whole or in part. Examples of such are the following:

Triphenyl aluminum
Diethyl isobutyl aluminum
Triisopropyl aluminum
Diisobutyl ethyl aluminum
Diisobutyl aluminum hydride
Triisoamyl aluminum
Trioctyl aluminum
Tridodecyl-aluminum
Tricyclohexyl aluminum The solid polymers obtained from the polymerization of ethylene in the presence of an organo aluminum compound and a vanadic ester are suitable for the production of molded and extruded articles, as non-corrosive electrical insulation, and for the manufacture of films, sheeting and fibers. The absence therefrom of corrosive halogen residues not only prevents corrosion of metallic substances coming in contact therewith but also improves the stability of the polymer when exposed to sunlight and weathering conditions.

What is claimed is:

1. Method for polymerizing ethylene to a normally solid polymer free from halogen residues which comprises contacting ethylene under polymerizing conditions with a catalyst composition consisting essentially of an organo-aluminum compound free from halogen and selected from the group consisting of compounds having the formula AlR$_3$ and compounds having the formula AlR$_2$H wherein R is a monovalent hydrocarbon radical, and a vanadium compound selected from the group consisting of an ortho vanadium ester having the formula R$_3$VO$_4$ wherein R is an alkyl group, the partially hydrolyzed esters thereof obtained by hydrolyzing said ortho vanadium ester with between 1 and 1.5 moles of water per mole of said ortho vanadium ester, and mixtures of said ortho vanadium esters and said partially hydrolyzed esters, said catalyst composition being dispersed in an inert hydrocarbon liquid.

2. Method according to claim 1 wherein the vanadium compound is an ortho vanadium ester having the formula R$_3$VO$_4$ wherein R is an alkyl group.

3. Method according to claim 1 wherein the vanadium compound is a partially hydrolyzed ester obtained by partially hydrolyzing an ortho vanadium ester having the formula R$_3$VO$_4$, wherein R is an alkyl group, with between 1 and 1.5 moles of water per mole of said ortho vanadium ester.

4. Method according to claim 1 wherein the organo-aluminum compound has the formula AlR$_3$ wherein R is an alkyl group.

5. Method for polymerizing ethylene according to claim 1 wherein the polymerization reaction temperature is between about 25° C. and 140° C. and the pressure is above atmospheric pressure.

6. Method according to claim 1 wherein per liter of inert hydrocarbon liquid there is present from 1 to 10 milligram atoms of vanadium as vanadic ester and at least an equimolar amount of the organo-aluminum compound.

7. Catalyst composition effective for polymerizing an olefin to a solid polymer consisting essentially of an organo-aluminum compound selected from the group consisting of compounds having the formula AlR$_3$ and AlR$_2$H wherein R is a monovalent hydrocarbon radical, and a vanadium compound selected from the group consisting of an ortho vanadium ester having the formula R$_3$VO$_4$ wherein R represents an alkyl group, the partially hydrolyzed esters thereof obtained by hydrolyzing said ortho vanadium ester with between 1 and 1.5 moles of water per mole of said ortho vanadium ester, and mixtures of said ortho vanadium ester and said partially hydrolyzed esters.

8. Catalyst composition according to claim 7 wherein the organo-aluminum compound has the formula AlR$_3$ wherein R is an alkyl group.

9. Catalyst composition according to claim 7 wherein the vanadium compound is an ortho vanadium ester having the formula R$_3$VO$_4$ wherein R is an alkyl group.

10. Catalyst composition according to claim 9 wherein the ortho vanadium ester is triethyl vanadate.

11. Catalyst composition according to claim 7 wherein the vanadium compound is a partially hydrolyzed ester obtained by partially hydrolyzing an ortho vanadium ester having the formula R$_3$VO$_4$, wherein R is an alkyl group, with between 1 and 1.5 moles of water per mole of said ortho vanadium ester.

12. Catalyst composition according to claim 11 wherein the vanadium compound is the partially hydrolyzed ester of triethyl vanadate and has the empirical formula $(C_2H_5)_4V_4O_{12}$.

13. Catalyst composition according to claim 11 wherein the vanadium compound is the partially hydrolyzed ester of triethyl vanadate and has the empirical formula $(C_2H_5)_2V_{10}O_{26}$.

14. Catalyst composition according to claim 11 wherein the vanadium compound is the partially hydrolyzed ester of triethyl vanadate and has the empirical formula $(C_2H_5)_4V_{10}O_{27}$.

References Cited in the file of this patent

UNITED STATES PATENTS

| 2,440,498 | Young et al. | Apr. 27, 1948 |
| 2,721,189 | Anderson et al. | Oct. 18, 1955 |
| 2,771,463 | Field et al. | Nov. 20, 1956 |
| 2,824,090 | Edwards et al. | Feb. 18, 1958 |

FOREIGN PATENTS

| 534,792 | Belgium | Jan. 31, 1955 |
| 533,362 | Belgium | May 16, 1955 |

OTHER REFERENCES

"Linear and Stereoregular Addition Polymers," by Gaylord, published by Interscience, New York, 1959.

Belgian Patent No. 546,151, abstract in Belgian "Recucil," dated Mar. 19, 1956.